(12) United States Patent
Ur

(10) Patent No.: US 9,338,257 B2
(45) Date of Patent: May 10, 2016

(54) SCENE-BASED VARIABLE COMPRESSION

(75) Inventor: Shmuel Ur, Galil (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/389,432

(22) PCT Filed: Mar. 18, 2011

(86) PCT No.: PCT/US2011/028985
§ 371 (c)(1),
(2), (4) Date: Feb. 7, 2012

(87) PCT Pub. No.: WO2012/128743
PCT Pub. Date: Sep. 27, 2012

(65) Prior Publication Data
US 2014/0006643 A1 Jan. 2, 2014

(51) Int. Cl.
*G06F 15/16* (2006.01)
*H04L 29/06* (2006.01)
*H04N 19/12* (2014.01)
*H04N 19/136* (2014.01)
(Continued)

(52) U.S. Cl.
CPC ............... *H04L 69/04* (2013.01); *H04N 19/12* (2014.11); *H04N 19/136* (2014.11); *H04N 19/162* (2014.11); *H04N 19/179* (2014.11)

(58) Field of Classification Search
CPC ...................................................... H04L 29/06
USPC .................... 709/247; 375/240; 382/232, 234
See application file for complete search history.

(56) References Cited

U.S. PATENT DOCUMENTS

| | | | | |
|---|---|---|---|---|
| 839,596 | A | * | 12/1906 | Kamy ........................... 474/174 |
| 4,743,959 | A | * | 5/1988 | Frederiksen ............. 375/240.25 |

(Continued)

FOREIGN PATENT DOCUMENTS

| | | |
|---|---|---|
| JP | 11-127150 | 5/1999 |
| JP | 2000-287173 | 10/2000 |

(Continued)

OTHER PUBLICATIONS

Lotfallah, O.A. et al., "Adaptive bitstream switching of scalable video," Image Communication, vol. 22, Issue 10, Nov. 2007, pp. 809-832.

(Continued)

*Primary Examiner* — Ario Etienne
*Assistant Examiner* — Sahera Halim
(74) *Attorney, Agent, or Firm* — Brundidge & Stanger, P.C.

(57) ABSTRACT

Technology is disclosed for enabling scene-based variable compression ("the technology"). In some embodiments, the technology can receive an indication of a compression level for a first content type, wherein the compression level specifies a tolerance level for lossy compression; receive a request for content, the content having at least two portions, wherein a first portion has first content of the first content type and the second portion has second content of a second content type, a first compression method associated with the indicated compression level and a second compression method associated with a different compression level. The technology can transmit the content, wherein the first portion of the content was compressed using the first compression method and the second portion was compressed using the second compression method.

20 Claims, 8 Drawing Sheets

(51) Int. Cl.
*H04N 19/162* (2014.01)
*H04N 19/179* (2014.01)

(56) References Cited

U.S. PATENT DOCUMENTS

| | | | | |
|---|---|---|---|---|
| 6,330,363 | B1* | 12/2001 | Accad | 382/232 |
| 7,062,088 | B1 | 6/2006 | Clauson | |
| 7,715,475 | B1* | 5/2010 | Puri et al. | 375/240 |
| 8,370,398 | B2* | 2/2013 | Carter | 707/802 |
| 8,427,346 | B2* | 4/2013 | Potkonjak | 341/50 |
| 8,514,298 | B2* | 8/2013 | Ordoubadian | 348/231.2 |
| 8,625,910 | B2* | 1/2014 | Uro et al. | 382/232 |
| 8,631,055 | B2* | 1/2014 | Wegener | 708/203 |
| 2003/0236904 | A1 | 12/2003 | Walpole et al. | |
| 2007/0192086 | A1* | 8/2007 | Guo et al. | 704/200.1 |
| 2008/0229356 | A1* | 9/2008 | Nadarajah et al. | 725/39 |
| 2008/0250080 | A1* | 10/2008 | Arrasvuori et al. | 707/203 |
| 2009/0122870 | A1* | 5/2009 | Sadowski et al. | 375/240.24 |
| 2010/0040152 | A1 | 2/2010 | Kortum et al. | |
| 2010/0189183 | A1 | 7/2010 | Gu et al. | |

FOREIGN PATENT DOCUMENTS

| | | |
|---|---|---|
| JP | 2001265645 A | 9/2001 |
| JP | 2002-344941 | 11/2002 |
| JP | 2004-336730 | 11/2004 |
| JP | 2006-311078 | 11/2006 |
| JP | 2007-158644 | 6/2007 |
| JP | 2007-318258 | 12/2007 |
| JP | 2010-199977 | 9/2010 |
| WO | 2011/011052 | 1/2011 |

OTHER PUBLICATIONS

"Lossy Compression," updated on Oct. 18, 2013, accessed at http://en.wikipedia.org/wiki/Lossy_compression, accessed on Oct. 29, 2013, pp. 1-7.

"Comparison of video codecs," updated on Oct. 26, 2013, accessed at http://en.wikipedia.org/wiki/Comparison_of_video_codecs, accessed on Oct. 29, 2013, pp. 1-16.

Hunter, J. and Iannella, R., "The Application of Metadata Standards to Video Indexing," accessed at http://espace.library.uq.edu.au/eserv/UQ:7837/final.html, accessed on Oct. 29, 2013, pp. 1-22.

"Shazam—Song Recognition App for the iPhone [iPhone Apps Review]," http://www.iphonehacks.com/2008/07/shazam-review.html [last accessed Sep. 14, 2011], 4 pages.

Datta et al., "Person-on-Person Violence Detection in Video Data," http://www.cs.ucf.edu/~ankur/ICPR_2002.pdf [last accessed Feb. 3, 2012], 6 pages.

International Search Report for Application No. PCT/US2011/28985, dated May 19, 2011, 3 pages.

Järvi, A. et al., "Variable Quality Image Compression System Based on SPIHT," Signal Processing: Image Communication, vol. 14, 1999, pp. 683-696.

Khoja, S.A. and W. Hall, "Thematic Video Indexing to Support Video Database Retrieval and Query Processing," Proceedings of SPIE, vol. 3846, Sep. 1999, pp. 371-380.

Lopes, A. et al., "Nude Detection in Video Using Bag-of-Visual-Features," XXII Brazilian Symposium on Computer Graphics and Image Processing, Oct. 2009, pp. 224-231.

Ni, K. et al., "Epitomic Location Recognition," IEEE Transactions on Pattern Analysis and Machine Intelligence, 2009, 10 pages.

Yuriy, Chesnokov, "Ultra Rapid Object Detection in Computer Vision Applications with Haar-like Wavelet Features," http://www.codeproject.com/KB/audio-video/haar_detection.aspx [last accessed Sep. 14, 2011], 18 pages.

* cited by examiner

300

Compression levels

| | client id (302) | content type (304) | compression level (306) | ... |
|---|---|---|---|---|
| 308 | 1 | sports, wide angle | 0 | |
| 310 | 1 | sports, close up | 2 | |
| 312 | 1 | news | 4 | |
| 314 | 2 | nudity | 1 | |
| 316 | 2 | Clint Eastwood | 1 | |

| compression level (402) | compression method (404) |
|---|---|
| 0 | none |
| 1 | lossless |
| 2 | lossy_1 |
| 3 | lossy_2 |
| 4 | lossy_3 |

SCENE-BASED VARIABLE COMPRESSION

CROSS-REFERENCE TO RELATED APPLICATIONS

This Application is the National Stage filing under 35 U.S.C. §371 of PCT Application Ser. No. PCT/US11/28985 filed on Mar. 18, 2011.

BACKGROUND

Computer networks enable vast amounts of data (e.g., content) to be transferred from one computing device to another computing device. As an example, a client computing device may access multimedia content stored at a server computing device via an intranet or the Internet. Because network bandwidth is limited, various compression methods are used to compress content that is to be transferred between computing devices. As an example, an international standards organization moving picture experts group ("MPEG") has proposed compression methods for multimedia content.

Compression methods use a fewer number of bits to store data than the number of bits that represent the uncompressed data. Compressed data can thus require less storage space to store and reduced network bandwidth to transmit the compressed data as compared to the equivalent data prior to compression ("uncompressed data").

Compression methods can be lossy or lossless. When a lossy compression method is used to compress data, the compressed data generally cannot be used during expansion to reproduce the originally compressed data with complete fidelity. In contrast, when a lossless compression method is used to compress data, the compressed data can be used to reproduce the originally compressed data with complete fidelity. Thus, which compression method is used to compress data can affect the playback quality of media content.

SUMMARY

Technology is disclosed for enabling scene-based variable compression ("the technology"). The technology can receive an indication of a compression level for a first content type, wherein the compression level specifies a tolerance level for lossy compression; receive a request for content, the content having at least two portions, wherein a first portion has first content of the first content type and the second portion has second content of a second content type, a first compression method associated with the indicated compression level and a second compression method associated with a different compression level. The technology can then transmit the content to respond to the request, wherein the first portion of the content was compressed using the first compression method and the second portion was compressed using the second compression method.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a table diagram illustrating a table the technology may employ in various embodiments, e.g., to store indications of client preferences.

FIG. 4 is a table diagram illustrating a table the technology may employ in various embodiments, e.g., to store associations between compression levels and compression methods.

DETAILED DESCRIPTION

Figure 1:
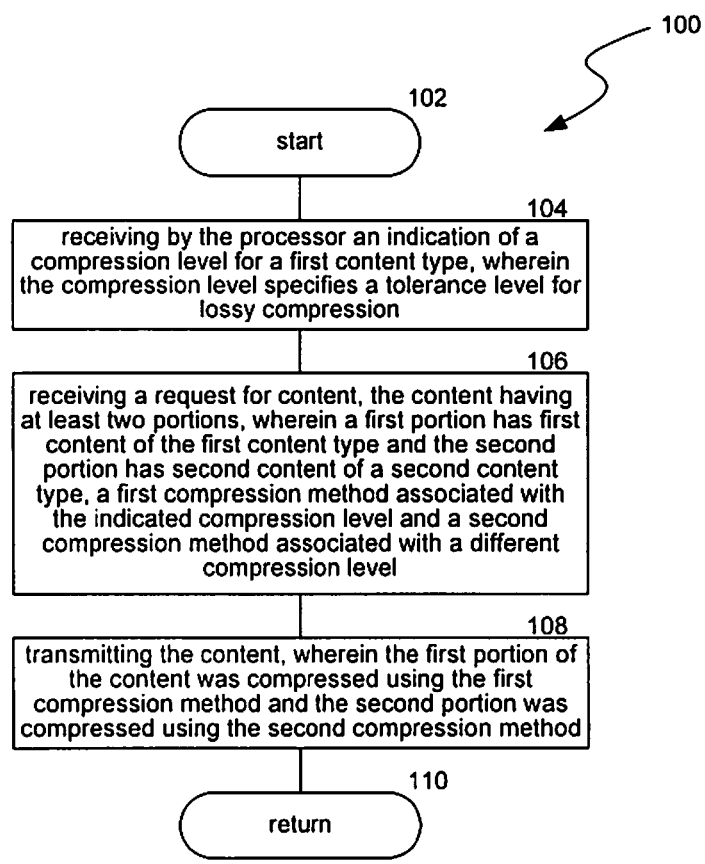
FIG. 1 is a flow diagram illustrating a routine that the technology may invoke in various embodiments, e.g., to respond to requests for content.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is disclosed for enabling scene-based variable compression ("the technology"). In various embodiments, the technology enables delivery of content that is variably compressed based on scene-based preferences that are previously received from a requester of the content. A client (e.g., a client computing device or a user of the client computing device) can indicate preferences for various content types. As an example, the client can indicate that a wide-angle view of a sporting event should not be compressed, but a news program can be heavily compressed. A server can then store the preferences indicated by the client. When the client subsequently requests content (e.g., content that is to be downloaded or streamed), the server can then respond to the request by selecting content that is compressed according to the client's previously provided preferences. The content can be dynamically compressed (e.g., just before it is delivered to satisfy requests) or previously compressed and stored. When a server responds to client requests for content, the server can determine what content types correspond to the content either by detecting scenes dynamically (e.g., near the time the content is to be provided to the client) or by retrieving metadata associated with the portions of the requested content.

The content can include multiple scenes, each corresponding to a different content type. As an example, a sports show may include a portion of a game (e.g., a professional basketball game), followed by an analysis. The game portion may include multiple wide-angle parts and multiple close-up parts. The analysis portion may be similar to a news program.

If the client that requests the content has specified preferences not to compress wide-angle shots, compress close-up shots somewhat, and compress news programs substantially, then the server may provide the sports show to the client with each part compressed accordingly.

A client can specify preferences for compression based at least on various scene-based factors, e.g., the gender or identity of the present speaker, the content type (e.g., violence, sex, nature, dance, news, etc.), and so forth. The preferences the client specifies may additionally indicate a preferred or desired compression level or a compression method for at least some of the content types. The technology may select various compression methods for the indicated compression levels. Thus, the technology is capable of providing content that responds to client indications of scene-based compression in a way that varies with content types. When the client specifies a particular compression level, the technology in some embodiments may vary compression parameters for a particular compression method (e.g., a specific lossy compression method) to achieve more or less compression, and each such variance can be referred to herein as a different compression method.

In various embodiments, initial scene recognition may initially be performed by a client computing device. As an example, the client computing device may initially receive content compressed using a first compression method (e.g., a lossy compression method). The client computing device may employ a scene recognition algorithm to recognize that the content contains a particular scene that a user of the client has previously indicated to be something the user wants to see with higher fidelity than would be possible when content is compressed using the first compression method. Upon recognizing that the content contains such a scene, the client computing device may indicate to the server computing device to use a second compression method (e.g., a lossless or "less lossy" compression method) that provides higher fidelity than the first compression method. The server computing device may then provide the content that is compressed using the second compression method. Later, when the client computing device determines that the received content includes a different scene that the user has not indicated should be received at higher fidelity than would be possible when content is compressed using the first compression method, the client computing device may request the server computing device to revert to using the first compression method (or a different compression method).

In various embodiments, the user may be able to indicate that the user wants to see some content types with lower fidelity than would occur when the content is compressed using the first compression method. In such embodiments, the client computing device may employ the scene recognition algorithm to recognize that the content contains a particular scene that the user has previously indicated to be something the user wants to see with lower fidelity than would be possible when content is compressed using the first compression method. Upon recognizing that the content contains such a scene, the client computing device may indicate to the server computing device to use a third compression method (e.g., a lossless or "more lossy" compression method) that provides lower fidelity than the first compression method. The server computing device may then provide the content that is compressed using the third compression method. Later, when the client computing device determines that the received content includes a different scene that the user has not indicated should be received at lower fidelity than would be possible when content is compressed using the third compression method, the client computing device may request the server computing device to revert to using the first compression method (or a different compression method).

In various embodiments, different servers can be used, e.g., one to store client preferences, a second to store content, and a third to respond to client requests. The technology will now be described with reference to the figures.

FIG. 1 is a flow diagram illustrating a routine 100 that the technology may invoke in various embodiments, e.g., to respond to requests for content. The routine 100 begins at block 102 and continues to block 104. At block 104, the routine 100 receives an indication of a compression level for a first content type, wherein the compression level specifies a tolerance level for lossy compression. The routine 100 then continues at block 106, where it receives (e.g., from a client) a request for content. The content may have at least two portions, wherein a first portion has first content of a first content type and the second portion has second content of a second content type. There may be a first compression method associated with the indicated compression level and a second compression method associated with a different compression level. The routine 100 then continues at block 108, where it transmits to the requestor of the content (e.g., to the client) the content, wherein the first portion of the content was compressed using the first compression method and the second portion was compressed using the second compression method. The routine 100 then continues to block 110, where it returns. The routine 100 may compress the content prior to transmission or may retrieve previously compressed content.

The routine 100 may further receive the indication of the compression level from a client computing device that requests the content. The routine 100 may further compress the first portion of the content using the first compression method. The first portion of the content may have a first size and a compressed size of the first portion of the content may be smaller than a result of using the second compression method to compress the first portion of the content. The routine 100 may further dynamically select, e.g., in nearly real time, a compression method for each portion of the content based on a content type associated with that portion of the content. A content type may be indicated in metadata associated with at least one of the portions of content. Alternatively, a content type may be automatically detected, e.g., based on a scene. The content type may be at least one of scenery, sex of a speaker, identity of a speaker, sports, wildlife, news, or sexual. As an example, when the first content type is news and the second content type is sports, the first compression method may be more lossy than the second compression method. As another example, when the first content type is a wide-angle view and the second content type is a close-up view, the first compression method may be less lossy than the second compression method.

Those skilled in the art will appreciate that the logic illustrated in FIG. 1 and described above, and in each of the flow diagrams discussed below, may be altered in a variety of ways. For example, the order of the logic may be rearranged, sublogic may be performed in parallel, illustrated logic may be omitted, other logic may be included, etc.

Figure 2:
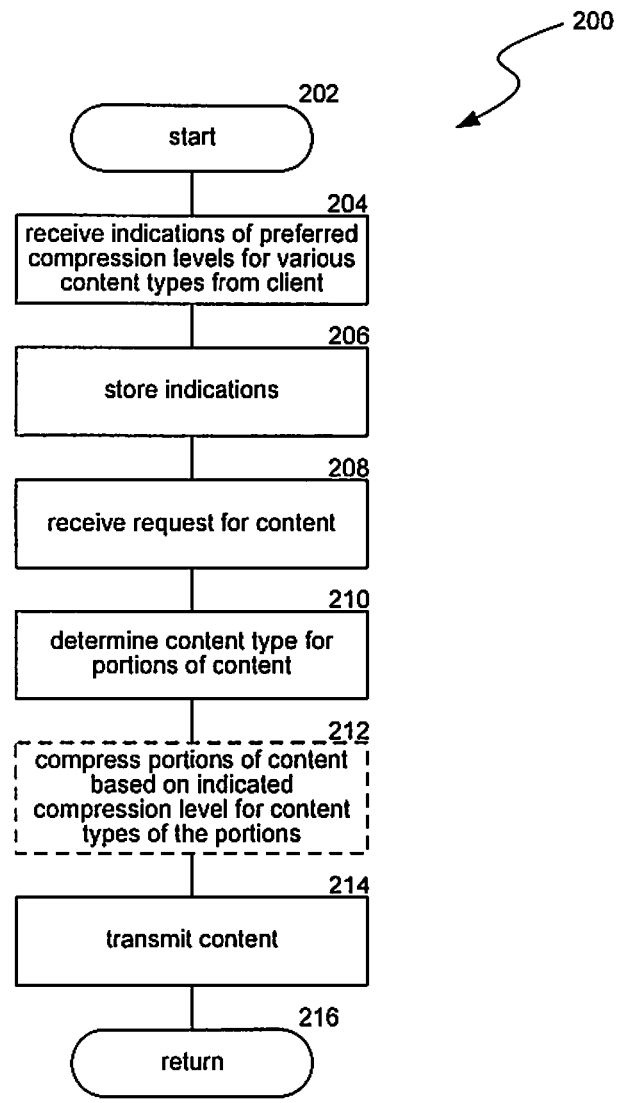
FIG. 2 is a flow diagram illustrating a routine that the technology may invoke in various embodiments, e.g., to respond to requests for content.

FIG. 2 is a flow diagram illustrating a routine 200 that the technology may invoke in various embodiments, e.g., to respond to requests for content. The routine 200 begins at block 202 and continues to block 204. At block 204, the routine 200 receives (e.g., from a requester of content, such as a client) indications of preferred or desired compression levels for various content types. The routine 200 then continues at block 206, where the routine 200 stores the received indications, e.g., at a storage device communicably coupled to a server. The routine 200 then continues at block 208, where it receives (e.g., from the client) a request for content. The content can be multimedia content for download or streaming, or any other type of content. The routine 200 then continues at block 210, where it determines content types for various portions of the requested content. The technology may determine content type by checking metadata associated with each portion of content, dynamically evaluating the content, etc. Various technologies exist for dynamically evaluating content. As examples, technology exists for facial detection, location recognition, nudity recognition, voice recognition, etc. The technology may employ one or more of these existing technologies to dynamically evaluate content to identify content types for portions of content.

The routine 200 then continues in various embodiments either at block 212 or at block 214. At block 212, the routine 200 optionally compresses portions of the content, e.g., based on indicated compression levels for content types of portions of the content. Alternatively or in addition, the routine 200 can retrieve previously compressed content (not illustrated). In various embodiments, when a portion has been previously compressed at the preferred or desired compression level, the technology may simply retrieve the previously compressed portion instead of compressing it again. The routine 200 then continues at block 214.

At block 214, the routine 200 transmits the content, e.g., to the client that requested the content. The routine 200 then continues at block 216, where it returns.

FIG. 3 is a table diagram illustrating a compression levels table 300 the technology may employ in various embodiments, e.g., to store indications of client preferences. The table 300 includes multiple columns, e.g., a client identification column 302, a content type column 304, and a compression level column 306. The client identification column 302 can store identifications of clients, e.g., globally unique identifiers, network address identifiers, etc. The content type column 304 can store indications of content types, e.g., sports, news, nudity, actors, etc. The compression level column 306 can store indications of compression levels. Thus, each row in table 300 stores associations between client identifiers, content types, and compression levels so that the technology can determine which compression level to use for any particular client when the client requests content having any particular content type. In various embodiments, the technology may apply a default compression level when the client has specified no particular compression level for any given content type that is encountered while transmitting the requested content to the client. As an example, rows 308, 310, and 312 are associated with a client having a client identifier of 1. Row 308 specifies that the content type of sports with a wide-angle view should have a compression level of 0; row 310 specifies that the content type of sports with a close-up view should have a compression level of 2; and row 312 specifies that the content type of news should have a compression level of 4. Rows 314 and 316 are associated with a client having a client identifier of 2. Row 314 specifies that the content type of nudity should have a compression level of 1 and row 316 specifies that when a scene includes actor Clint Eastwood the compression level should be 1.

Although FIG. 3 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 4 is a table diagram illustrating a table 400 the technology may employ in various embodiments, e.g., to store associations between compression levels and compression methods. The table 400 includes a compression level column 402 and a compression method column 404. The compression level column 402 corresponds to column 306 of FIG. 3. The compression method column 404 indicates which compression method is to be used for any particular compression level. As examples, no compression is to be used when the compression level is 0, lossless compression is to be used when the compression level is 1, a first lossy compression method is to be used when the compression level is 2, a second lossy compression method is to be used when the compression level is 3, and a third lossy compression method is to be used when the compression level is 4.

Figure 5:
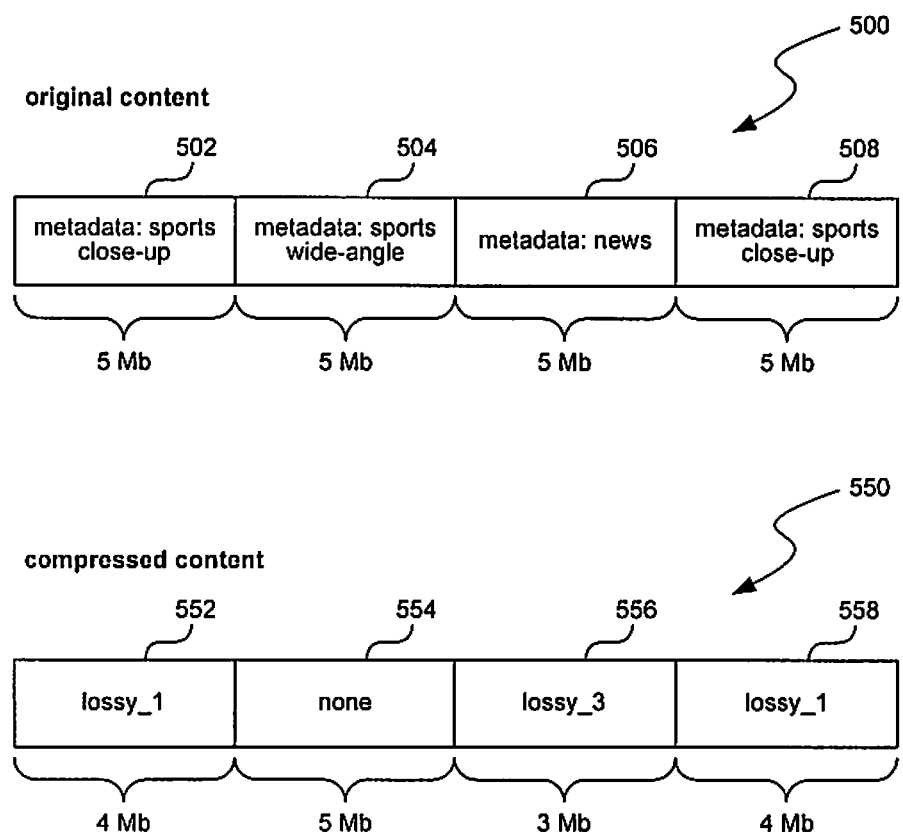
FIG. 5 is a schematic diagram illustrating a comparison between original content and compressed content in various embodiments.

FIG. 5 is a schematic diagram illustrating a comparison between original content 500 and compressed content 550 in various embodiments. The original content 500 includes a sports close-up part 502, a sports wide-angle part 504, a news part 506, and a sports close-up part 508. Each of the four parts has an original size of 5 megabytes ("Mb"). Each part also indicates a content type corresponding to that part in metadata associated with the part. The compressed content 550 includes the same parts as original content 500, but some of the parts have been compressed according to the selected compression levels identified for client 1 in FIG. 3 for each part. As examples, part 552 corresponds to part 502, but is compressed with a first lossy compression method; part 554 corresponds to part 504, and has not been compressed; part 556 corresponds to part 506, but is compressed with a third lossy compression method, and part 558 corresponds to part 508, but is compressed with the first lossy compression method. After compression, part 552 becomes 4 Mb, part 554 remains at 5 Mb, part 556 becomes 3 Mb, and part 558 becomes 4 Mb. Thus, the original content has a total of 20 Mb, but the compressed content has a total of 16 Mb.

Figure 6:
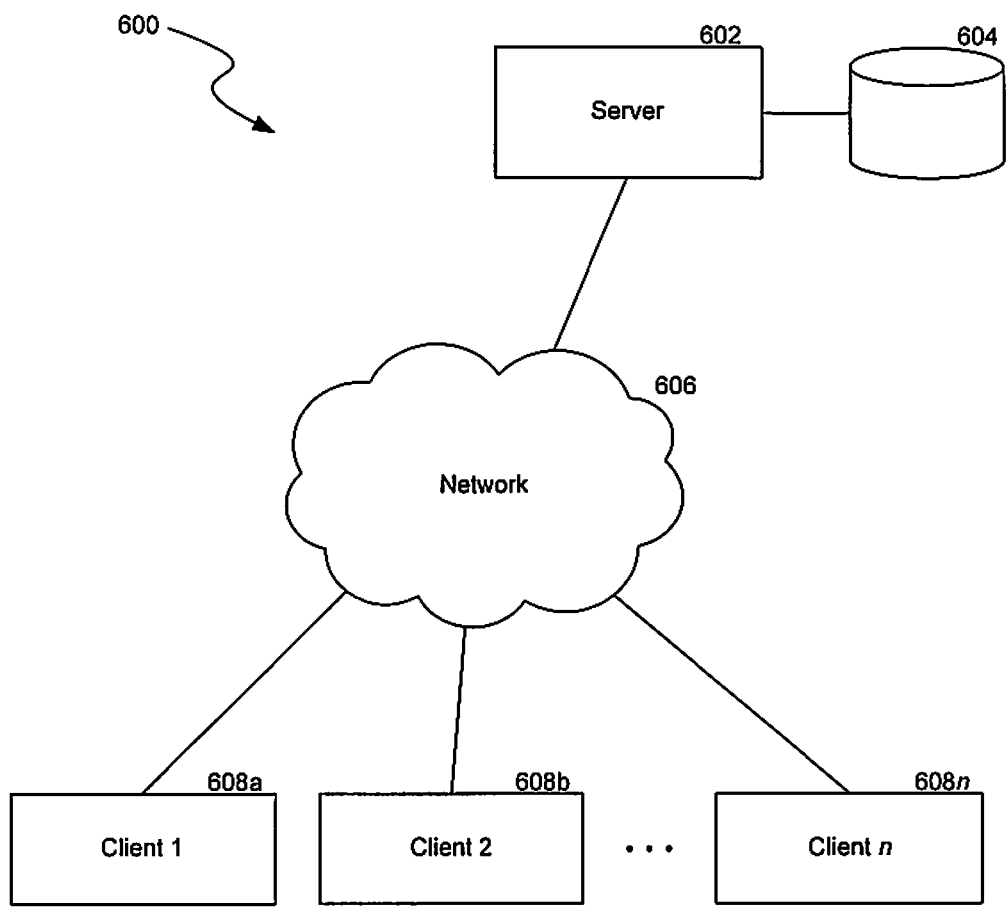
FIG. 6 is a block diagram illustrating an environment in which the technology may operate in various embodiments.

FIG. 6 is a block diagram illustrating an environment 600 in which the technology may operate in various embodiments. The environment 600 can include one or more servers 602. As an example, the environment 600 can include a server for storing client preferences, content, and/or compressed content, e.g., in a storage 604 that may be communicably coupled to the server 602. The server may be communicably coupled via a network 606 to one or more client computing devices 608, e.g., client computing devices 608a, 608b, and 608n. The clients or the servers can in various embodiments be general-purpose computing devices or special-purpose computing devices, e.g., as described in further detail below in relation to FIG. 9.

Figure 7:
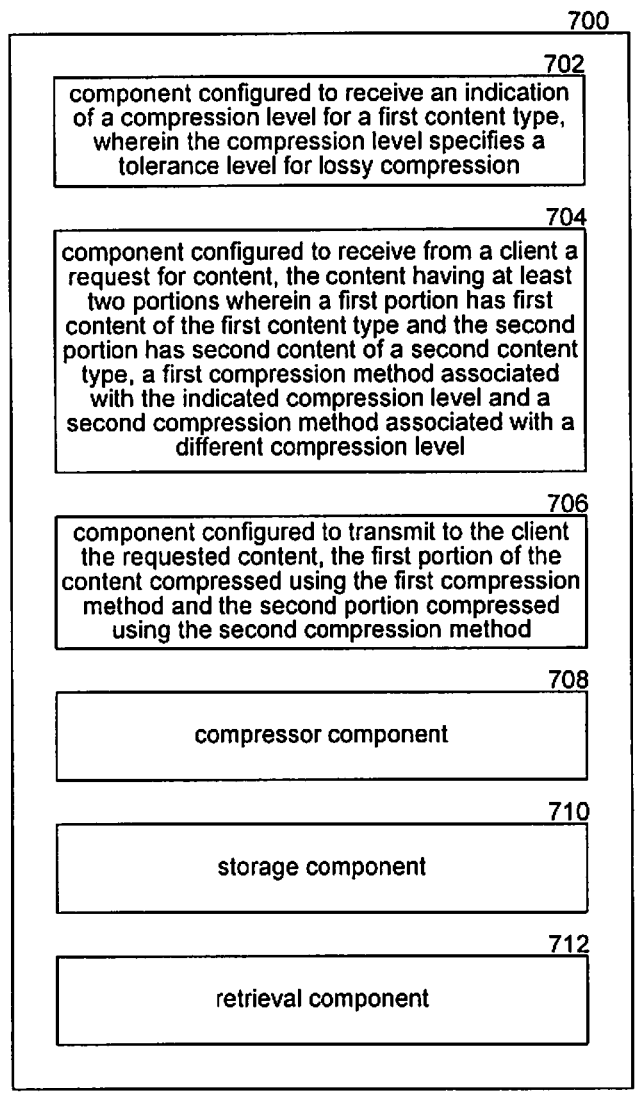
FIG. 7 is a block diagram illustrating components the technology may employ in various embodiments.

FIG. 7 is a block diagram illustrating components 700 the technology may employ in various embodiments. A component 702 can be configured to receive an indication of a compression level for a first content type, wherein the compression level specifies a tolerance level for lossy compression. A component 704 can be configured to receive from a client a request for content, the content having at least two portions wherein a first portion has first content of the first content type and the second portion has second content of a second content type, wherein a first compression method is associated with the indicated compression level and a second compression method is associated with a different compression level. A component 706 can be configured to transmit to the client the requested content, the first portion of the content compressed using the first compression method and the second portion compressed using the second compression method. A compressor component 708 can compress content, e.g., using one or more compression methods. A storage component 710 can store various data, e.g., content, client preferences, compressed data, etc. A retrieval component 712 can retrieve various data, e.g., content, client preferences, compressed data, etc. The technology may also employ other components (not illustrated).

Figure 8:
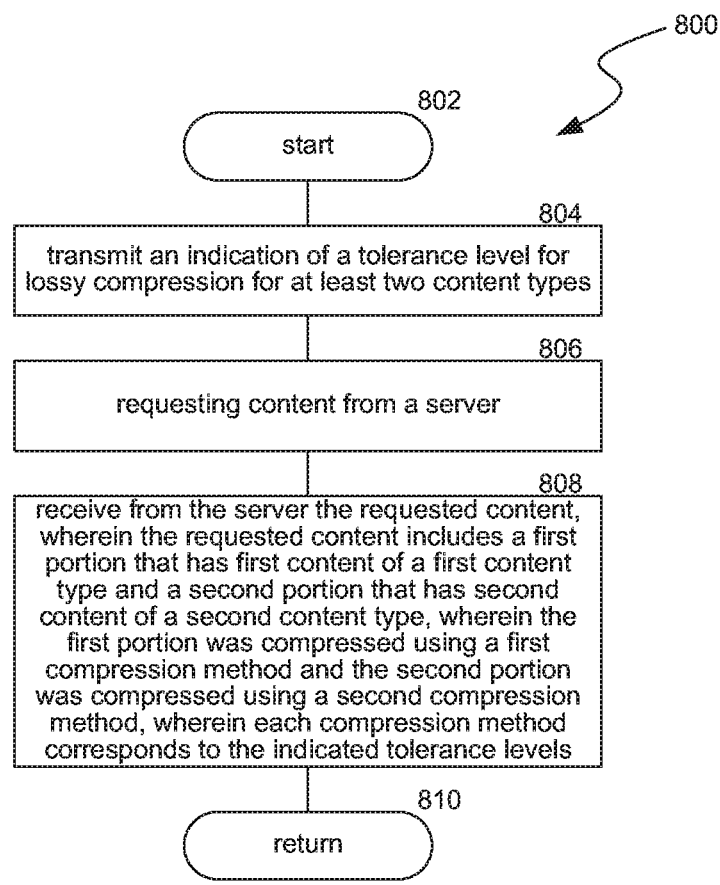
FIG. 8 is a flow diagram illustrating a routine that the technology may invoke in various embodiments, e.g., to transmit preferences for compression levels.

FIG. 8 is a flow diagram illustrating a routine 800 that the technology may invoke in various embodiments, e.g., to transmit preferences for compression levels. The routine 800 starts at block 802. The routine then continues at block 804, where it transmits an indication of a tolerance level for lossy compression for at least two content types. The routine then continues at block 806, where it requests content from a server. The routine then continues at block 808 where it receives from the server the requested content, wherein the requested content includes a first portion that has first content of a first content type and a second portion that has second content of a second content type, wherein the first portion was compressed using a first compression method and the second portion was compressed using a second compression method, wherein each compression method corresponds to the indicated tolerance levels. The routine then continues at block 810, where it returns.

Figure 9:
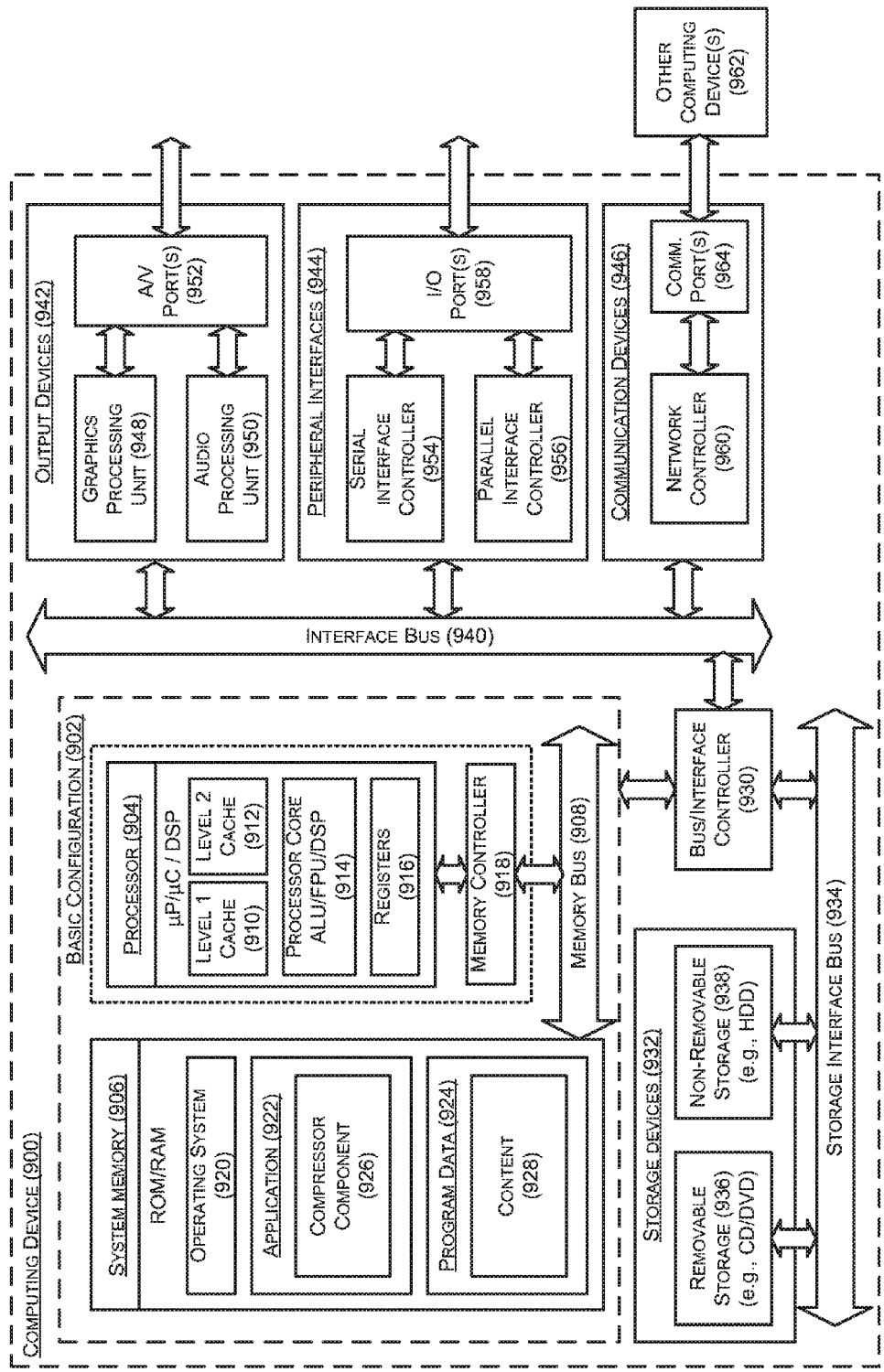
FIG. 9 is a block diagram of an illustrative embodiment of a computing device that is arranged for scene-based variable compression in accordance with at least some embodiments of the present disclosure.

FIG. 9 is a block diagram illustrating an example computing device 900 that is arranged for scene-based variable compression in accordance with at least some embodiments of the present disclosure. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a compressor component 926 that is arranged to compress data using one or more compression methods. Program data 924 may include content 928 (e.g., multimedia content) that clients may request, as is described herein. In some embodiments, application 922 may be arranged to operate with program data 924 on operating system 920 such that rotation of displayed information is enabled or disabled, e.g., depending on an orientation of the display. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

From the foregoing, it will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

I claim:

1. A method performed by a computing device having a processor and memory, the method comprising:
   receiving, by the processor, a first indication of a compression level for a first content type and a second indication of a compression level for a second content type, as determined by a user, wherein the compression level specifies a tolerance level for lossy compression;
   storing, by the processor, the first indication of the compression level for the first content type and the second indication of the compression level for the second content type, as determined by the user, with a user identifier, wherein the first indication and the second indication of the compression level are numerical values, respectively;
   receiving, by the processor, from the user a request for content, the content having at least two portions,
      wherein a first portion has first content of the first content type and a second portion has second content of the second content type and the first content type and the second content type are, respectively, determined by one or more scene-based factors;
   selecting, by the processor, a compression method for each portion of the content based on a content type associated with each respective portion of the content; and
   transmitting, by the processor, the content, wherein the first portion of the content is compressed using a first compression method and the second portion is compressed using a second compression method,
      wherein the first compression method is associated with the first indication of the compression level, and the second compression method is associated with the second indication of the compression level that is a different compression level from the first indication of the compression level.

2. The method of claim 1, further comprising receiving the first and the second indication of the compression level from a client computing device that requests the content.

3. The method of claim 1, further comprising compressing the first portion of the content using the first compression method.

4. The method of claim 3, wherein the first portion of the content has a first size and a compressed size of the first portion of the content is smaller than a result of using the second compression method to compress the first portion of the content.

5. The method of claim 1, wherein the content type is indicated in metadata associated with at least one of the portions of content.

6. The method of claim 1, wherein the content type is automatically detected.

7. The method of claim 1, wherein the first compression method is more lossy than the second compression method when the first content type is news and the second content type is sports.

8. The method of claim 1, wherein the first compression method is less lossy than the second compression method when the first content type is a wide-angle view and the second content type is a close-up view.

9. A system, comprising:
   a processor and memory;
   a component configured to:
      receive a first indication of a compression level for a first content type and a second indication of a compression level for a second content type determined by a user, wherein the compression level specifies a tolerance level for lossy compression, and
      store the first indication of the compression level for the first content type and the second indication of the compression level for the second content type determined by the user with a user identifier, wherein the first indication and the second indication of the compression level are numerical values, respectively;
   a component configured to receive from the user a request for content, the content having at least two portions wherein a first portion has first content of the first content type and the second portion has second content of the second content type and the first content type and the second content type are, respectively, determined by one or more scene-based factors;
   a component configured to select a compression method for each portion of the content based on a content type associated with each respective portion of the content; and
   a component configured to transmit to the user the requested content, the first portion of the content compressed using a first compression method and the second portion compressed using a second compression method,
      wherein the first compression method is associated with the first indication of the compression level, and the second compression method is associated with the second indication of the compression level that is a different compression level from the first indication of the compression level.

10. The system of claim 9, further comprising:
a component configured to compress the first portion of the content using the first compression method.

11. The system of claim 9, further comprising:
a component configured to retrieve previously compressed content from a storage.

12. The system of claim 9, further comprising:
a storage for metadata associated with the content.

13. The system of claim 12, wherein the metadata is associated with at least some portions of the content and the first compression method is selected based on metadata associated with the first portion.

14. The system of claim 12, wherein the first compression method is selected based on dynamically recognizing the first content type.

15. A non-transitory computer-readable storage device storing computer-executable instructions, the instructions comprising:
   transmitting an indication of a tolerance level for lossy compression for at least two content types, respectively, wherein the indication is determined by a user, and wherein the indication is a numerical value;
   requesting, from a server, content; and
   receiving, from the server, the requested content, wherein the requested content includes a first portion that has first content of a first content type and a second portion that has second content of a second content type and the first content type and the second content type are, respectively, determined by one or more scene-based factors, wherein the first portion is compressed using a first compression method and the second portion is compressed using a second compression method, wherein each compression method corresponds to the indicated tolerance level associated with a user identifier, and wherein a compression method for each portion of the content is selected by the server based on a content type associated with each respective portion of the content.

16. The non-transitory computer-readable storage device of claim 15, further comprising:
   instructions for compressing the first portion of the content using the first compression method.

17. The non-transitory computer-readable storage device of claim 15, wherein the first compression method is selected based on metadata associated with the first portion of the content, and wherein the metadata indicates the first content type.

18. The non-transitory computer-readable storage device of claim 15, wherein the content type is indicated in metadata associated with at least one of the portions of content.

19. The method of claim 1, wherein the content type is at least one of scenery, sex of a speaker, identity of a speaker, sports, wildlife, news, or sexual.

20. The method of claim 1, wherein the selecting the compression method for each portion of the content is done dynamically in real time.

* * * * *